No. 628,389. Patented July 4, 1899.
J. R. BRADLEY.
MACHINE FOR LABELING TINS, JARS, BOTTLES, &c.
(Application filed Nov. 2, 1898.)
(No Model.) 7 Sheets—Sheet 1.

No. 628,389. Patented July 4, 1899.
J. R. BRADLEY.
MACHINE FOR LABELING TINS, JARS, BOTTLES, &c.
(Application filed Nov. 2, 1898.)

(No Model.) 7 Sheets—Sheet 3.

Witnesses.
Inventor.
J. R. Bradley
By Attorneys.

No. 628,389. Patented July 4, 1899.
J. R. BRADLEY.
MACHINE FOR LABELING TINS, JARS, BOTTLES, &c.
(Application filed Nov. 2, 1898.)
(No Model.) 7 Sheets—Sheet 4.

No. 628,389. Patented July 4, 1899.
J. R. BRADLEY.
MACHINE FOR LABELING TINS, JARS, BOTTLES, &c.
(Application filed Nov. 2, 1898.)
(No Model.) 7 Sheets—Sheet 5.

No. 628,389. Patented July 4, 1899.
J. R. BRADLEY.
MACHINE FOR LABELING TINS, JARS, BOTTLES, &c.
(Application filed Nov. 2, 1898.)

(No Model.) 7 Sheets—Sheet 6.

Witnesses.
Inventor
J. R. Bradley.
By Attorneys

UNITED STATES PATENT OFFICE.

JAMES RICHARD BRADLEY, OF NORTH UNLEY, SOUTH AUSTRALIA, ASSIGNOR OF ONE-HALF TO HUBERT GILES AND FRANCIS VILLIERS SANDERSON, OF ADELAIDE, SOUTH AUSTRALIA.

MACHINE FOR LABELING TINS, JARS, BOTTLES, &c.

SPECIFICATION forming part of Letters Patent No. 628,389, dated July 4, 1899.

Application filed November 2, 1898. Serial No. 695,332. (No model.)

*To all whom it may concern:*

Be it known that I, JAMES RICHARD BRADLEY, carpenter, a subject of the Queen of Great Britain and Ireland, and a resident of Rose street, North Unley, South Australia, have invented a certain new and useful Improved Machine for Labeling Tins, Jars, Bottles, and other Articles, of which the following is a specification.

This invention is designed to provide a machine which will effectually accomplish the affixing of labels to tins, jars, bottles, and other articles in an expeditious and satisfactory manner.

All the devices which combined make up the complete machine and are hereinafter described are actuated through their several connections from the one common shaft, called the "main" shaft, and each device is arranged and designed to perform its work at the proper time relatively to the operation of the others.

The several devices may be enumerated as follows: first, the feeding device for the tins, jars, bottles, or other articles to be labeled; second, the label-case and label elevating and retaining mechanisms; third, the pasting device, and, fourth, the apparatus for receiving the tins, jars, bottles, or other articles from the feeding device and forwarding the same over the label-case.

In order that my invention may be clearly understood, I will describe the same, with reference to the accompanying drawings, in which the same numbers indicate the same parts in all the figures, and the word "tin" or "tins" where used is to be held to include jars, bottles, and other articles to be labeled.

Figure 1:
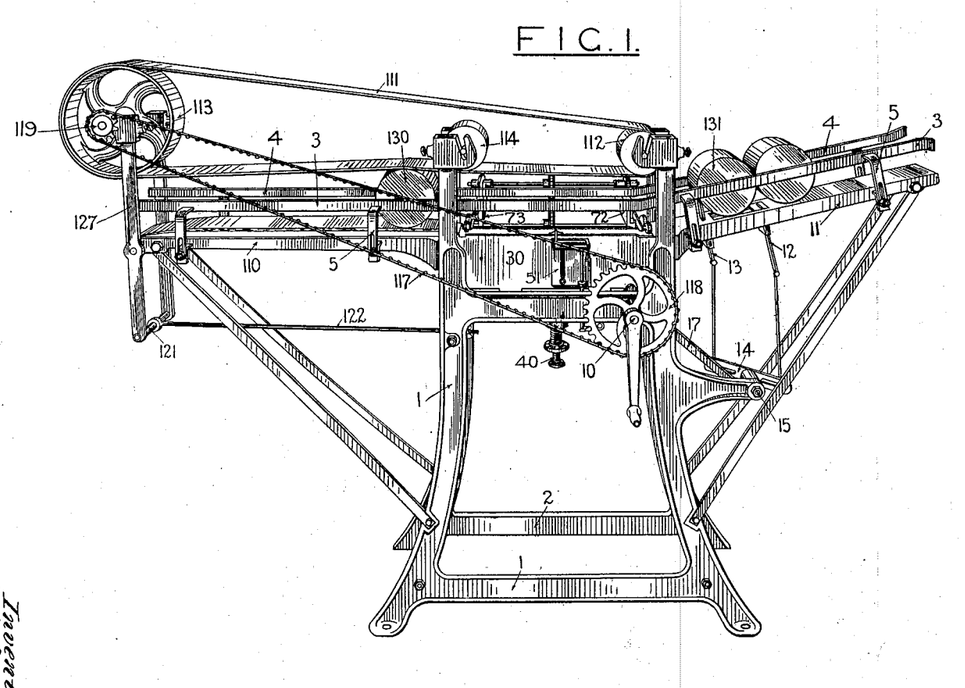
Figure 1 is a perspective front view of the machine complete.
Figures 2, 3:
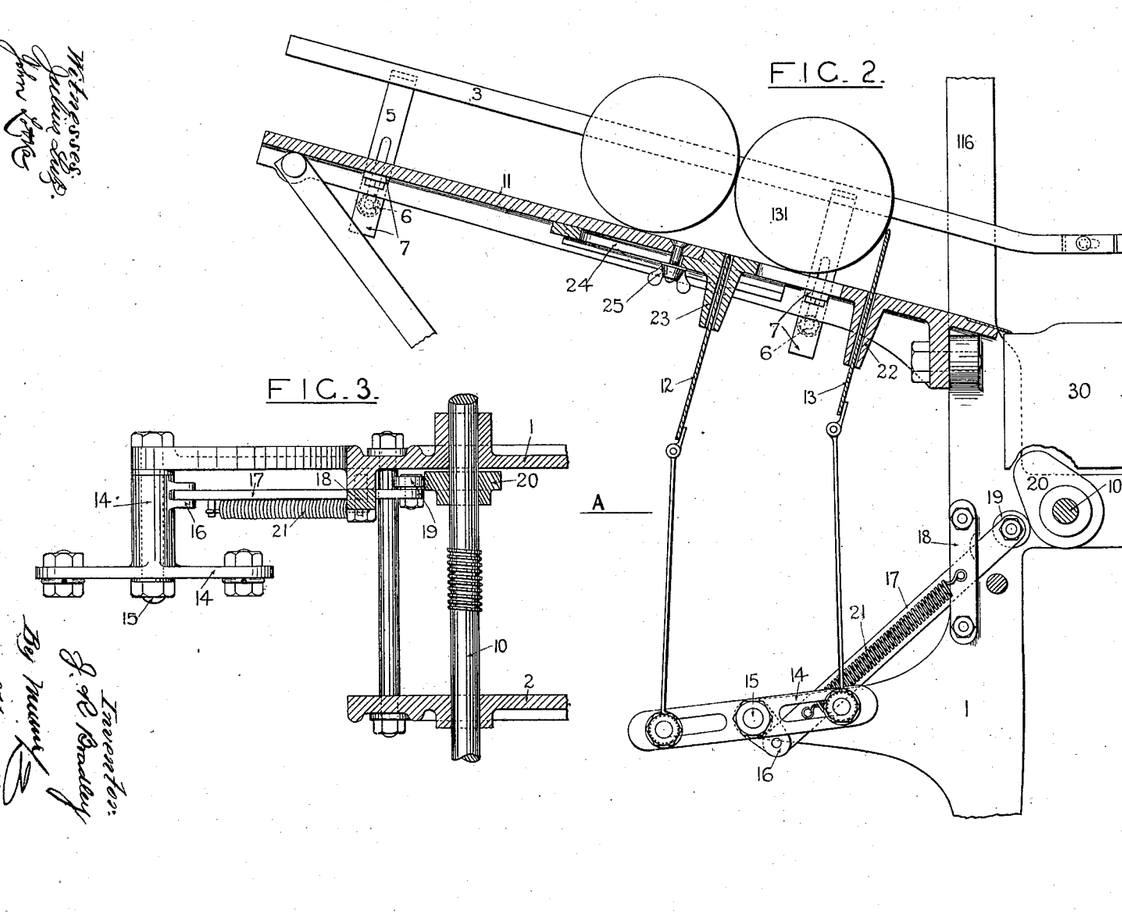
Fig. 2 is a central sectional rear elevation of the tin-feeding device.
Fig. 3 is a section on line A B of Fig. 2, showing the lower portion of the tin-feeding device.
Figure 4:
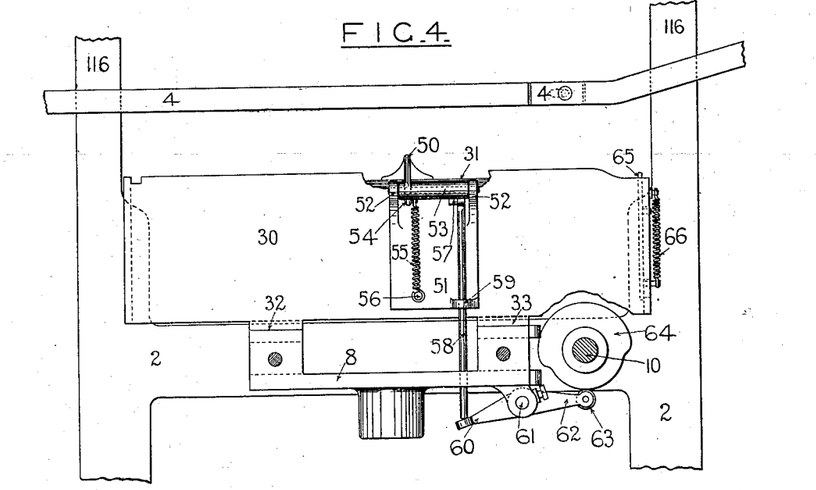
Fig. 4 is a front elevation of the label-case and the label-retaining mechanism, with the front standard of the frame removed and portions of the label-case broken away.
Figure 5:
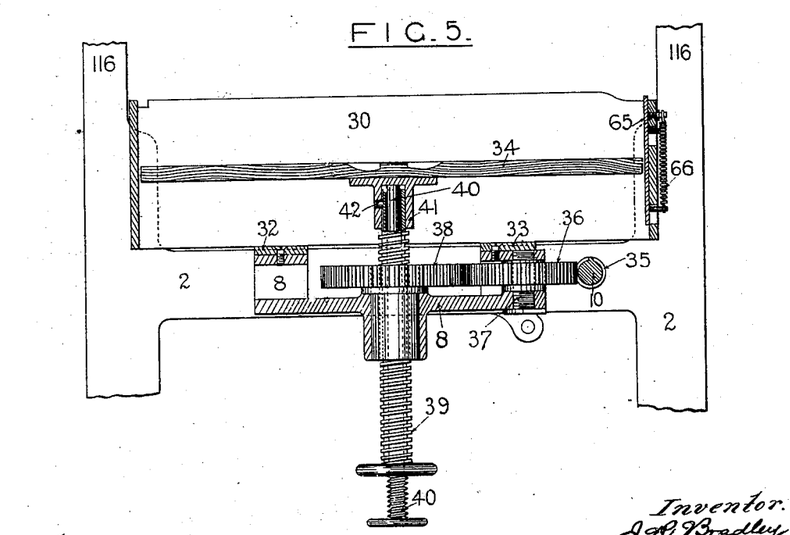
Fig. 5 is a central vertical section of the label-case and the label-elevating mechanism and the end label-stop.
Figure 6:
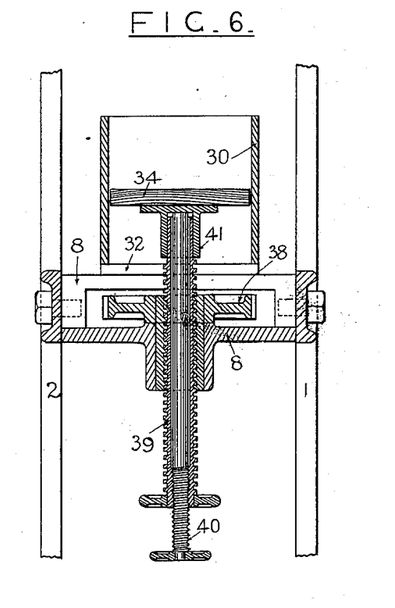
Fig. 6 is a central cross-section of the label-case and the label-elevating mechanism.
Figure 7:
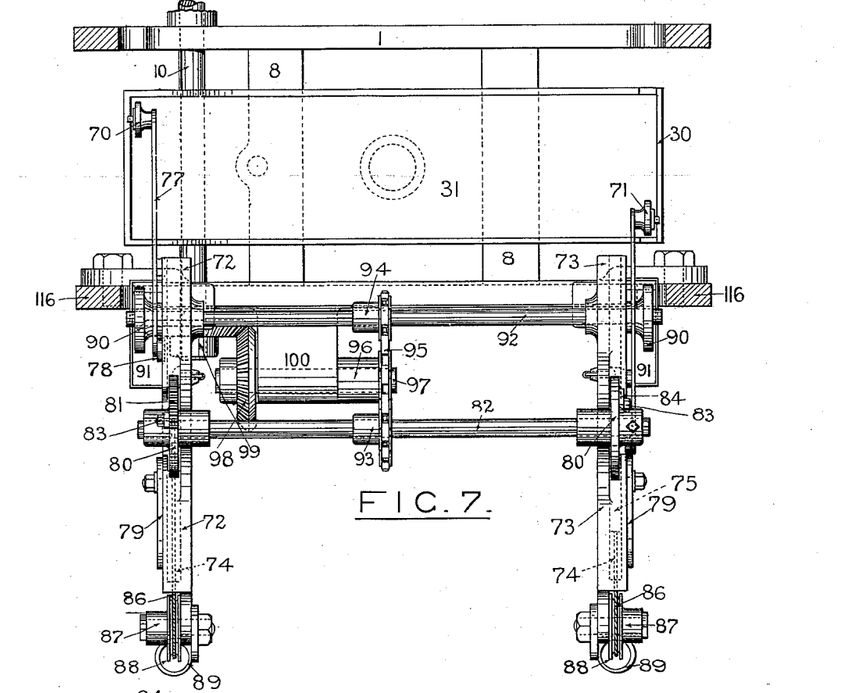
Fig. 7 is a plan of the pasting device.
Figure 8:
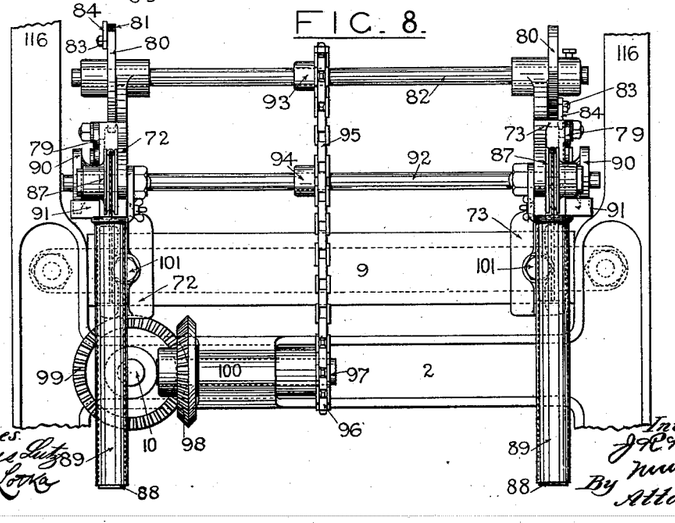
Fig. 8 is a rear elevation of the pasting device.
Figure 9:
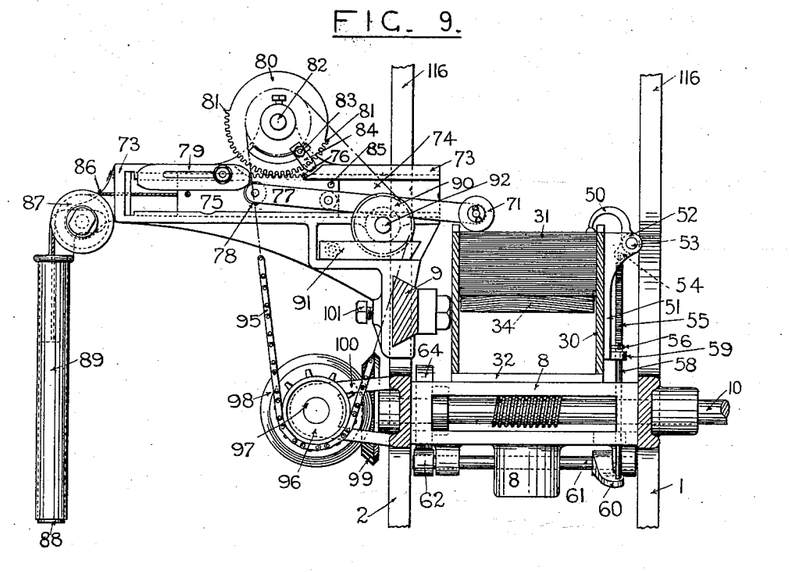
Fig. 9 is a side elevation of the pasting device, showing also the label-retaining mechanism and with the label-case in section.
Figure 10:
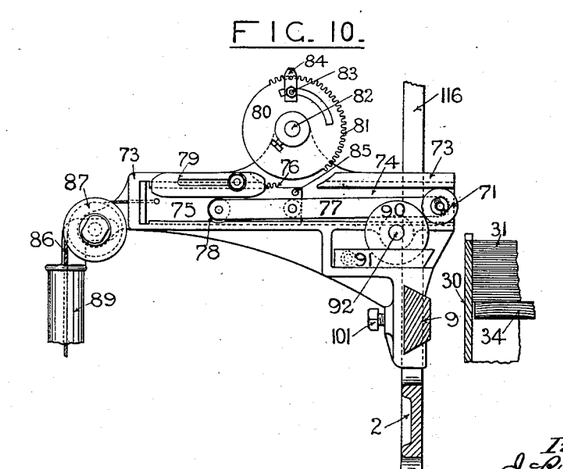
Fig. 10 is a side elevation of portion of the pasting device, showing the pasting-roller withdrawn from the label and receiving paste from the paste-supply rollers.
Figure 11:
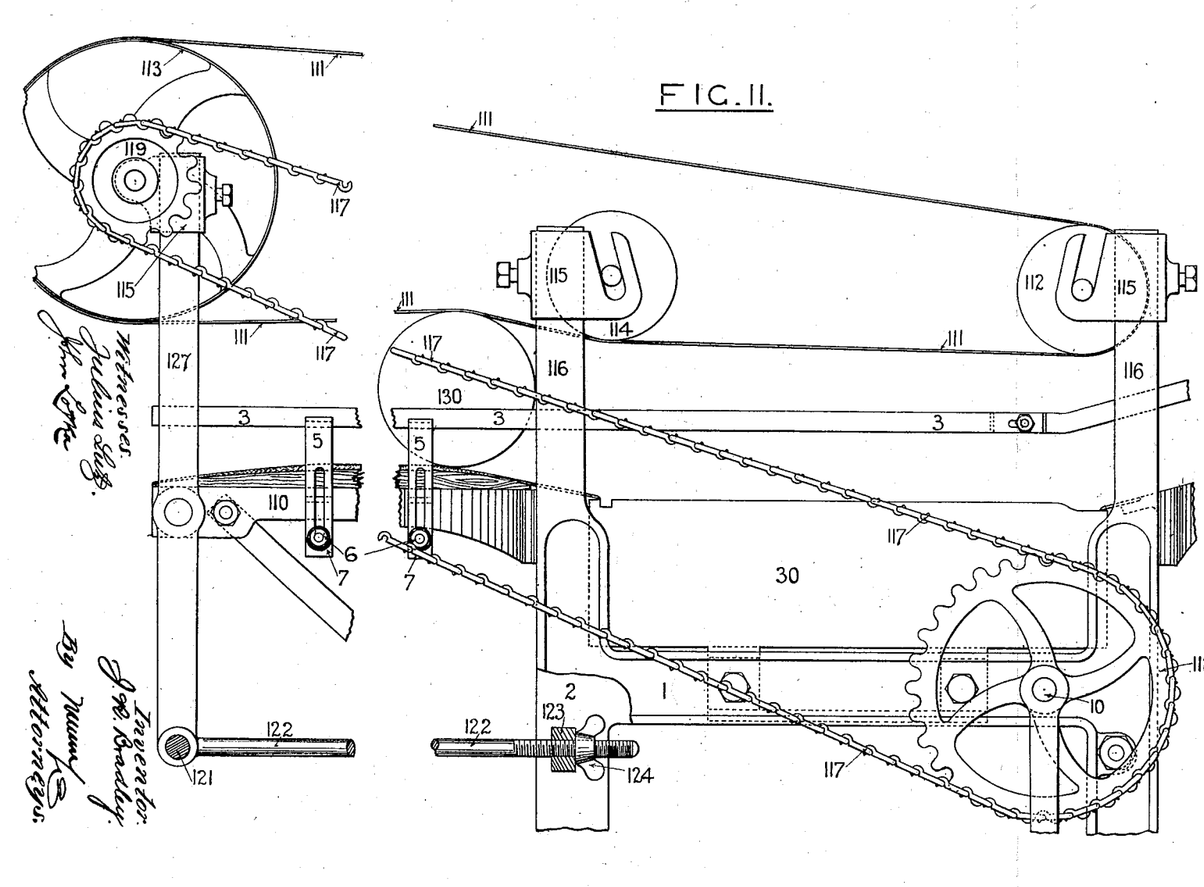
Fig. 11 is a front elevation of the apparatus for receiving the tins from the feeding device, forwarding them over the label-case, and applying pressure to the adhering label.

All of the figures except Fig. 10 show the parts in the position they occupy a little before the release of a tin by the feeding device.

The several devices are arranged above or about a platform extending from end to end of the machine and supported by a frame formed of suitable standards 1 and 2, rigidly braced together by bolts and stay-pieces. To the platform are attached two guide-rails 3 4, one at the front and one at the rear, by adjustable fastenings, permitting of vertical and horizontal movement, so that they may be set to accommodate tins of various diameters and lengths. Vertical movement is permitted by slots in the legs 5, which when the nuts 6 are slackened off allow the bars 3 4 to be moved up or down upon the stud projecting from the bearer 7. In and out horizontal movement is obtained by sliding the bearers 7 to and fro in slots in the side webs of the platform. Set-screws in the under side of the platform are provided for securing the bearers 7 in position.

Figure 12:
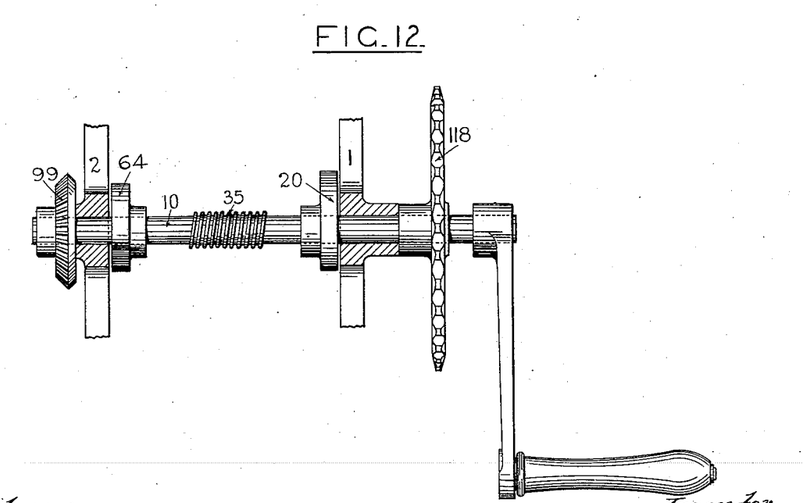
Fig. 12 shows the main shaft, with its fittings.

The main shaft 10 of the machine (shown more particularly in Fig. 12) extends from front to rear of the machine and rotates in two journals formed in the standards 1 2. It is shown fitted with a handle for operation by hand-power; but a pulley may be fitted for driving by a belt.

The feeding device consists of an inclined portion 11 of the platform, upon which the tins to be labeled are placed by any suitable means. At the lower end of the inclined platform 11 are arranged two retaining-stops 12 13, working through apertures in the platform 11, one connected to each end of a rocking frame 14, pivoted beneath the inclined platform upon a pin 15, projecting from an arm of the frame-standard 1. The rocking frame has a short arm 16, to which is connected the lower end of a push-bar 17, sliding in a guide 18, attached to the frame-standard, the upper end of the bar being provided with an antifriction-roller 19, impinging upon the surface of a cam 20, secured upon the main shaft 10, which as the shaft is rotated pushes down the bar 17. A spring 21 is fastened one end to the guide-piece 18 and the other end to the bar 17, whereby after depression by the cam 20 the bar and rocking frame are returned to their normal position.

The stops 12 13 are so arranged that only one projects through the platform at a time, and they are placed with a distance about equal to the diameter of one tin intervening between them, so that when the lower stop 13 releases one tin the upper stop 12 engages the succeeding tin upon the inclined platform 11 until the rocking frame 14 is returned to its normal position, when the tin moves forward and is retained by the lower stop 13.

The lower stop 13 works in a guide-box 22, formed on the under side of the platform 11, while the upper stop 12 works in a guide-box 23, carried by a plate 24, adapted to be moved toward or from the guide-box 23, according to the diameter of the tins being labeled. The plate 24 is supported by two ledges, one on each side on the under side of the platform, and is retained in position by a set-screw secured in the platform and passing through a slot in the plate and fitted with a thumb-nut 25.

The label-case 30, the top of which forms the center portion of the platform, is arranged over the main shaft 10 and is of length and breadth just sufficient to take the labels to be placed upon the tins and is deep enough to accommodate some two thousand labels 31, which are arranged within it with their backs upward, and in this position the rollers 70 71 of the pasting device hereinafter described impart to the topmost label the necessary amount of paste. The tin rolling from the inclined platform 11 is received on to the top of the label-case 30 and is fed forward by an endless band 111, arranged at a suitable distance above and parallel to the top of the labels 31. The lable-case 30 is supported and held in place by means of two bars 32 33, which extend from side to side of the case below the movable bottom 34 and which are secured by bolts or set-screws to a bed-piece 8, extending between and secured to the front and rear standards 1 2 of the frame.

To keep the top label at the proper height, the following mechanism as each label is removed raises the bottom 34 only of the case on which the labels 31 rest a distance equal to the thickness of one label. Upon the main shaft 10 is provided a worm 35, which, gearing with a gear or worm wheel 36 upon a vertical stud 37, secured in the bed-piece 8, imparts rotary motion to a second gear-wheel 38, which has its boss internally screw-threaded and is arranged upon a threaded shaft 39, attached to the bottom 34 of the label-case in such a manner that while the rotation of the shaft 39 is prevented the bottom 34 of the label-case may be adjusted vertically by means of a second shaft 40, extending up the center of the shaft 39 and having a screw-thread on its lower portion engaging with a screw-thread formed on the interior of shaft 39, both of the shafts being provided with hand-wheels for this purpose. The upper end of the shaft fits into a socket or cap 41, from the side of which a stud 42 projects into a keyway or groove in the shaft 39, thus preventing rotation, but permitting vertical movement, while the upper end of the shaft 40 impinges against the top of the socket or cap 41. The shaft 40 allows of an adjustment by hand of the bottom 34 of the case should such be necessary, while the other portion of the arrangement insures the necessary slow elevation of the labels 31 as the machine is operated. Separate label-cases are required for different-sized labels.

To prevent the top label being moved out of place either sidewise by the retreat of the pasting-rollers 70 71, or becoming twisted out of true, the following arrangements are provided. The movement of labels sidewise from or toward the pasting apparatus by reason of the advance or retreat of the rollers is prevented by means of a presser-foot 50, actuated as follows: To the side of the label-case 30 is attached by set-screws a vertical bed-plate 51, near the upper edge of which are two lugs 52 52, forming journals for the ends of a rock-shaft 53, which carries the presser-foot 50 upon the end of a short arm. To a short arm 54, also projecting from the rock-shaft 53, is connected a spring 55, the tendency of which is to hold the presser-foot 50 down upon the labels, its other end being connected to a pin 56 at the bottom of the bed-plate 51. To another short arm 57, projecting from the rock-shaft, is pivoted a rod 58, which is maintained in an upright position by an eye 59 near the bottom of the bed-plate. The bottom of this rod rests upon the face of an arm 60, projecting from a rock-shaft 61, extending across the under side of the bed 8 and carried in journals projecting therefrom. At the other end of this rock-shaft 61 is a second arm 62, provided in its end with an antifriction-roller 63, which impinges against the face of the cam 64 upon the main shaft 10. The cam 64 is so shaped and so set upon the shaft 10 that the presser-foot 50 is withdrawn from over the labels during the passage of the tin. The sides of the label-case 30 and the delivery end of the case project above the top of the labels, but the top of the feed end and the top of the sides at the feed end are cut away to below the level of the label. This allows the tins to come down upon the pasted end of the label, but prevents twisting of the labels. Notches are cut down to the top of the labels in the sides at the delivery end of the case to allow the passage of the paste-carrying roller 71. In order to prevent any label being pushed over the feed end of the case by the retreating tin, I provide a stop-plate 65 immediately inside the end of the case, sliding vertically in suitable guides and provided with an elevating-spring 66, whereby it is held in upper position till it is depressed to the level of the top label by the tin passing over it.

The pasting device consists, essentially, of two rollers 70 71, which are mounted upon suitable carriages adapted to be moved to and fro, carrying paste in narrow transverse strips across both ends of the topmost label. Rigidly secured to the rear standard 2 of the frame at the back of the label-case 30 is a bed-bar 9, upon which two frame-pieces 72 73 are mounted and secured by means of set-screws 101 in such a manner that they may be moved closer together or farther apart, as desired, according to the length of label being used. In each of these frame-pieces 72 and 73 a slideway 74 is formed, into which is fitted a sliding piece 75, having teeth 76 along its upper edge and having pivoted to it a rod or lever 77, upon the front end of which the paste-carrying roller 70 or 71 is journaled, while the rear end is provided with an anti-friction-roller 78, adapted to engage the under side of a guide-piece 79, secured in the requisite position upon the frame-piece. Above the slide-piece 75 is a wheel 80, portion of the periphery of which is provided with projecting teeth 81, which are adapted to engage with the teeth 76 on the slide-piece. Each of the two wheels 80 is secured in the desired position upon a common shaft 82 by a set-screw, the shaft 82 being carried by a bearing in the top of each of the frame-pieces 72 73. To the wheel 80 is secured by a bolt and nut 83 a finger-piece 84, which is adapted to engage a pin 85, projecting from the slide 75, and thus bring the teeth 81 on the wheel into gear with the teeth 76 on the slide. The bolt 83 passes through an arc-shaped slot in the wheel 80 to allow of adjustment, so that the teeth 81 and 76 may be made to engage one another sooner or later to accommodate labels of different widths. To the rear of the slide 75 is attached a cord 86, which passes over a pulley 87 and carries a weight 88, which moves up and down in a tube or guideway 89, attached to the rear of the frame-piece. Near the front of the frame-piece is a paste-supply roller 90, the lower portion of which is submerged in a bath of paste contained in a tray 91, secured on the side of the frame-piece. Each of the two paste-supply rollers 90 is secured to a common shaft 92 by a set-screw, the shaft 92 being supported by a bearing in each of the frame-pieces. Upon the two shafts 82 and 92, that of the wheels 80 and that of the rollers 90, are secured sprocket-wheels 93 94, which are connected by a chain belt 95 with a sprocket-wheel 96 upon the end of a short shaft 97, upon the other end of which is a toothed bevel-wheel 98, gearing with a bevel-wheel 99, keyed upon the end of the main shaft 10. The shaft 97 is supported by a bearing 100, projecting from the rear of the frame-standard 2.

The apparatus for receiving the tins and feeding them over the label which has been pasted and along the delivery-platform 110 consists of an endless band 111, of flexible material, carried upon rollers, one of which, 112, is mounted just above the termination of the inclined platform 11 of the feeding device and the other, 113, at such distance therefrom as may be found necessary. To secure additional pressure upon the tin while crossing the pasted label, another roller 114 is arranged above the farther extremity of the label-case 30. The pressure on the tin causes the adherence of the already-pasted label. The journals of these rollers are carried in blocks 115, adapted to be moved up and down the fixed pillars 116 and pivoted pillars 127 and provided with set-screws whereby they may be adjusted at a suitable height above the platform, according to the diameter of the tins being labeled. The blocks 115, carrying the rollers 112 and 114 at either end of the label-case, are provided with slots to take the journals of the rollers, so that the rollers may rise slightly to accommodate the tins. The farther roller 113 receives motion from the main shaft 10 through the medium of a chain 117 and chain-wheels 118 and 119. After passing over the label-case 30 the tin is received upon the delivery portion 110 of the platform. This is provided with a wooden bed, the upper surface of which is covered with a suitable resilient material, such as a blanket. In order to allow the band 111 and rollers 112 114 to be removed when desired, the pillars 127, which support the roller 113, are pivoted at about their centers to the end of the platform 110, and their lower ends are connected together by a bar 121, from which passes a rod 122, having a draw-screw on the other end passing through an eye 123 in one of the cross-bolts of the main frame and provided with a thumb-nut 124, whereby the band 111 may be tightened up or slackened off, as required.

The several mechanisms together constitute a machine capable of performing by hand or motive power the labeling of tins, jars, bottles, and other articles in an expeditious and satisfactory manner, and I will now describe the method of operation.

All of the drawings except Fig. 10 represent the parts in the position they occupy when the pasting-rollers 70 and 71 are advancing over the label. 130 represents a tin which has just been labeled, and 131 represents the one to be labeled next, the tin being held in place by the stop 13. The pasting-roller 70 nearer to the tin 131 has almost completed its passage, while the farther one 71 has not advanced so far across the label. The object of this arrangement is to allow the labeled tin 130 to get clear away from the labels before the farther roller 71 advances. The rotation of the main shaft 10 being continued, the rotation of the toothed wheels 80, actuated through the bevel-wheels 98 99 and chain 95, continues to drive the pasting-rollers forward until they reach the front edge of the label, by which time the end of the toothed portion of the wheels 80 is reached and the slides 75, which carry the pasting-rollers, are pulled back by means of the weights 88, withdrawing the pasting-rollers 70 71 from over the label. As the roller reaches the rear edge of the label the antifriction-roller 78, coming in contact with the under side of the guide-piece 79, tilts the rod or lever 77 and raises the pasting-roller from off the label. The paste-carrying roller until it is carried forward again rests upon the top of the paste-supplying roller 90, which as it revolves leaves a fresh charge of paste upon the pasting-roller. While the pasting-rollers are advancing over the label, the presser-foot 50 by means of the spring 55 is held down firmly upon the top label; but immediately the pasting-rollers have retreated from over the label the cam 64 upon the main shaft 10 operates the rock-shaft 61 and through the arm 60 lifts the rod 58, causing the presser-foot 50 to be lifted from over the label. Immediately the nearer roller 70 has retreated from off the label, the cam 20 by pushing down the bar 17 rocks the frame 14 and causes the stop 13 to be withdrawn, allowing the tin 131 to roll down until it is seized by the band 111, which rolls it along over the label, the pasted end of which adheres to the tin, and the label is wrapped around the tin, the paste on the other end of the label causing it to adhere to the first part of the label. As the stop 13 is depressed the stop 12 is raised, retaining the tins behind 131 until the cam 20 has released the bar 17, when the rocking frame 14 is returned by the spring 21 to its normal position, allowing the next tin to take the place of the tin 131. As the tin continues its movement along the platform beneath the band 111 additional pressure is put upon the label and it is delivered at the end of the platform 110 ready for packing. As the main shaft 10 rotates the worm 35, acting through the spur-wheels 36 38 and shaft 39, raises the bottom of the label-case 34 the required distance. Should it be necessary to make a slight adjustment of the height of the bottom of the label-case 34, this can be done by means of the screwed shaft 40.

What I claim as my invention, and desire to secure by Letters Patent, is—

1. A feeding device consisting essentially of an inclined platform, a rocking frame at the lower end of the platform, two retaining-stops working in guide-boxes on the under side of the platform, one of the stops being connected to each end of the rocking frame pivoted beneath the inclined platform, the rocking frame having an arm projecting therefrom having a push-bar pivoted thereto, a stationary guide for said push-bar, a cam secured upon the main shaft of the machine and engaging said push-bar, and a spring secured to said guide and to the push-bar, substantially as described and for the purpose set forth.

2. A label-case having a movable bottom attached to the upper end of a vertical externally and internally threaded shaft, a second externally-threaded shaft being arranged within the first shaft and adapted to raise the bottom of the label-case relatively to the top of the first shaft, substantially as described and for the purpose set forth.

3. A label-retaining device consisting of a presser-foot projecting from a rock-shaft normally held in position by a spring, and adapted to be rocked by means of a pivoted rod, and a second rock-shaft operated by a cam upon the main shaft, substantially as described and for the purpose set forth.

4. A pasting device consisting of a toothed slide having at its forward part a pivoted rod, upon the front end of which is journaled a paste-carrying roller, which alternately travels on the label and on the surface of a paste-supply roller, the slide being moved forward by a wheel having teeth upon a portion of its periphery, secured upon a spindle having a sprocket-wheel connected by a chain to a sprocket-wheel upon a shaft driven by bevel-gearing from the main shaft, while the return of the slide to the rear is caused by a weight, all substantially as described and for the purpose set forth.

5. The combination with the label-case and the delivery-platform, of an endless band of flexible material carried by suitable rollers above the label-case and the delivery-platform, the journals of the rollers over the label-case being carried in blocks which allow the rollers to rise and fall as required, while the blocks of the third roller are carried by pivoted pillars provided with means whereby the tension of the band may be adjusted, motion being given to one of the rollers from the main shaft by chain and chain-wheels, all substantially as described and for the purpose set forth.

6. A pasting device, consisting of a slide having rack-teeth, a rod hinged to the slide at one end and carrying at its other end a paste-roller, a gear-wheel engaging the rack-teeth, and means for operating the gear-wheel.

In testimony that I claim the foregoing as my invention I have signed my name, in the presence of two witnesses, this 28th day of May, 1898.

JAMES RICHARD BRADLEY.

Witnesses:
CHARLES NICHOLAS COLLISON,
ARTHUR GORE COLLISON.